United States Patent [19]
Miles et al.

[11] Patent Number: 5,110,204
[45] Date of Patent: May 5, 1992

[54] VELOCITY MEASUREMENT BY THE VIBRATIONAL TAGGING OF DIATOMIC MOLECULES

[75] Inventors: Richard B. Miles, Princeton; Walter R. Lempert, Mercerville, both of N.J.

[73] Assignee: Trustees of Princeton University, Princeton, N.J.

[21] Appl. No.: 609,929

[22] Filed: Nov. 6, 1990

[51] Int. Cl.⁵ ............................................. G01P 3/36
[52] U.S. Cl. ....................................... 356/28; 307/426; 356/28.5; 356/301; 356/318; 359/327
[58] Field of Search ............... 250/287, 356.1, 393; 356/28, 28.5, 301, 318; 307/426

[56] References Cited

U.S. PATENT DOCUMENTS

| | | | |
|---|---|---|---|
| 3,467,917 | 9/1969 | Patel et al. | 307/426 |
| 4,071,298 | 1/1978 | Falconer | 356/73 |
| 4,222,011 | 9/1980 | Kurnit | 307/426 |
| 4,254,348 | 3/1981 | Stappaerts | 307/426 |
| 4,334,779 | 6/1982 | Domey et al. | 356/358 |
| 4,361,770 | 11/1982 | Rabinowitz | 307/426 |
| 4,483,614 | 11/1984 | Rogers | 356/28.5 |
| 4,505,586 | 3/1985 | Tochigi et al. | 356/301 |
| 4,572,667 | 2/1986 | Rogers | 356/317 |
| 4,573,796 | 3/1986 | Martin et al. | 356/318 |
| 4,585,341 | 4/1986 | Woodfield | 356/28.5 |
| 4,624,561 | 11/1986 | Exton | 356/28.5 |
| 4,715,707 | 12/1987 | Reynolds, III et al. | 356/28.5 |
| 4,807,990 | 2/1989 | Keefer | 356/28.5 |
| 4,822,164 | 4/1989 | Breen | 356/28.5 |
| 4,919,536 | 3/1990 | Komine | 356/28.5 |

FOREIGN PATENT DOCUMENTS 2500376 7/1976 Fed. Rep. of Germany.

OTHER PUBLICATIONS

Adrian, "Engineering Applications of Particle Imaging Velocimeters", 58/L.I.A., vol. 68 ICALEO (1989).
Gelbwachs, IEEE J. Quant, Electronics, vol. 24, p. 1268 (1988).
Korevaar, Rivers, and Liu, "Space Sensing Communications and Networking", SPIE, vol. 1059, p. 111 (1989).
Lehmann, S. A. Lee, and She, Optics Letters, vol. 11, pp. 563–565 (1986).
Matveev, "Atomic Resonance Spectrometers and Filters (Review)", Translated from Zhurnal Prikladnoi Spektroskopii, vol. 46, No. 3, pp. 359–375, Mar. 1987.
Shimizu, Lee, She, Appl. Opt., "High Spectral Resolution Lidar System with Atomic Blocking Filters for Measuring Atmospheric Parameters", vol. 22, p. 1373 (1983).
M. Smith, Smits, R. Miles, Optics Letters, vol. 14, p. 916 (1989).
Van Zee, Blankespoor, Zwier, Chemical Physics Letters, vol. 158, p. 306 (1989).
Yip, Fourguette, M. B. Long, Applied Optics, vol. 25, p. 3919 (1986).

*Primary Examiner*—Stephen C. Buczinski
*Attorney, Agent, or Firm*—Watov & Kipnes

[57] ABSTRACT

First and second relatively high power laser beams are directed into a volume enclosing a flow field of molecules of a molecular species. The beams are focussed to form an overlapping region of the beams in the flow field, for tagging a portion of the associated molecules by driving them into their first vibrational state by stimulated Raman pumping. A high intensity beam of light is directed into the flow field proximate the overlap region for intercepting the tagged molecules, and causing them to fluoresce, thereby permitting their displacement to be measured through observation thereof, for determining the velocity of the associated molecules and flow field.

26 Claims, 6 Drawing Sheets

VELOCITY MEASUREMENT BY THE VIBRATIONAL TAGGING OF DIATOMIC MOLECULES

GOVERNMENT LICENSE RIGHTS

This invention was made with government support under Contract No. AFOSR-89-0420-D awarded by the Department of Defense, Air Force Office of Scientific Research. The government has certain rights in this invention.

RELATED APPLICATION

This application is related to Ser. No. 07/581,408, entitled "ABSORPTION LINE FILTER WINDOW AND METHOD FOR VELOCITY MEASUREMENTS BY LIGHT SCATTERING", filed on Sept. 11, 1990, and allowed on Oct. 22, 1990. The assignee for this related application is the same as for the present application.

BACKGROUND OF THE INVENTION

The measurement of the motion of gas, particularly that of air, is important for a wide range of applications. Methods for the control of combustion and other gas processing require the measurement of mass flow rate, which implies a measurement of velocity. Similarly, the control of aircraft requires accurate measurement of the angle-of-attack and sideslip. The measurement of velocity flow fields around aircraft, cars, electronic components, etc., is an important factor in developing optimum design. Studies of turbulence require an accurate measurement of velocity fields, as does the understanding of mixing processes, bursting, vorticity, and other phenomena associated with the unstable motion of fluids. Understanding these mechanisms is critical for the development of high-performance aircraft, compressors, turbines, engines, low-drag vehicles, and effective air cooling systems. The accurate real-time measurement of velocity may lead to the implementation of advanced strategies for the control of turbulent and unstable phenomena.

In many cases, it is important to acquire velocity data without interfering with the flow field. This is particularly true for unsteady and turbulent flows where an interfering measurement may significantly perturb the flow field. Nonintrusive measurements are also important in high-speed flows where shockwave structure may form around an intrusive probe, obscuring a true measurement of the flow velocity. In unsteady flows, the simultaneous measurement of velocity at multiple points is preferred.

Various approaches have been developed for the nonintrusive measurement of velocity. Perhaps the most common one is based on particle scattering and is called "Laser Doppler Velocimetry (LDV)" (see Reynolds et al. U.S. Pat. No. 4,715,707). This approach generates single point measurements which can only occur when a particle passes through a small volume defined by the intersection of two laser beams. Thus, it is not a field measurement approach and requires that the flow either be seeded or have a relatively high density of naturally occurring particles.

"Particle Imaging Velocimetry (PIV)" (R. Adrian, Int. J. Heat & Fluid Flow, Vol. 7, #2, June 1986, p. 127) is another approach to generating velocity field measurements. In this case, a high-intensity sheet of light illuminates many particles in a plane and this scattering is recorded by a camera. A short time later the particles are illuminated again, and their new location is again recorded. The displacement of each particle is then a measure of the local flow field velocity.

Particles can also be used for global velocimetry by observing the brightness of the scattering as a function of the Doppler shift when the scattered light is passed through a spectral filter with a linear variation of the transmission as a function of frequency (Komine U.S. Pat. No. 4,919,536). One can also use optical heterodyne (Breen U.S. Pat. No. 4,822,264), interferometric (German DT U.S. Pat. No. 2,500,376; Domey et al. U.S. Pat. No. 4,822,164; or Rizzo U.S. Pat. No. 3,825,346) or spectral analysis (Woodfield U.S. Pat. No. 4,585,341) to observe Doppler shifts from individual particles or volume elements containing particles. All these approaches require that the flow be seeded or have naturally occurring particles.

Small particles have been shown to be good indicators of flow motion for low-speed flows. In high-speed compressible flows, however, the particles cannot track the motion unless they are so small that they are no longer useful for LDV, PIV, or other particle related measurements. Furthermore, unless the particle density is extremely high, there are gaps in the flow field velocity measurement due to the absence of particles. On the other hand, if the particle density is too high, particle methods are no longer viable since, in the cases which require single particle observations, more than one particle occupies the scattering volume, and in the planar imaging cases, one loses the ability to determine which particles seen in the second image correlate with the original particles in the first image. In the linear filter approach, high particle densities lead to secondary scattering; so the observed brightness of the particle is not a true measure of the velocity.

Another approach to the nonintrusive measurement of flow velocity relies on narrow linewidth laser-induced fluorescence. In this case, the Doppler shift of a narrow linewidth atomic or molecular transition is observed by using a narrow linewidth laser source. To date, no appropriate absorption lines have been found in naturally occurring air, so these approaches required that the flow fields be seeded with foreign vapors including sodium (R. Miles, *Physics of Fluids* 18, p. 751, 1975), iodine (J. McDaniel, B. Hiller, and R.K. Hanson, *Optics Letters*, 8, #1, p. 51, Jan. 1983), or nitric oxide (P.H. Paul, M.P. Lee, and R.K. Hanson, *Optics Letters* 14, #9, p. 417, May 1989).

Velocity can also be measured by observing the Doppler shift associated with direct Rayleigh scattering from molecules seen through a sharp cutoff, narrow linewidth optical filter (R. Miles, Appl. Phys. B 51, #1, p. 1, 1990). This approach does not require particle or molecular seeding and leads to field measurements of velocity. The accuracy of the measurement is limited by the low Rayleigh scattering cross section and it is difficult to follow particular fluid elements to observe velocity profiles and turbulent structure.

Various approaches to flow tagging have been attempted including simple heating of a foreign material (J. Sell and R. Cattolica, Appl. Optics 25, #9, p. 1420, May 1986), and laserinduced dissociation of water (L. Boedeker, Opt. Lett. 14, #10, p. 473, May 1989). In liquids, the photochromic effect has been exploited by using an argon-fluoride laser to write colored lines into a photochromic compound in kerosene (R. Falco and L. Chu, SPIE Vol. 814, "Photomeohanics and Speckle Metrology", p 706, 1987). Current work is underway to expand this technique to air flows by putting the photochromic compound into a mist and tracking the motion of the mist suspended in the air.

SUMMARY OF THE INVENTION

It is the object of the present invention to provide a velocity measurement apparatus based on vibrationally tagging and following diatomic molecules in air or other gas mixtures. Since oxygen or nitrogen can be used, no seed material is required for air. Marked regions can be points, lines, grids, or shaped structures so point vorticity and vorticity fields can also be directly measured in both high and low speed flows.

The present invention teaches a nonintrusive velocity measurement apparatus which is based on tagging diatomic molecules by vibrational excitation and following their motion in flowing gas. The molecules are vibrationally excited through the mechanism of stimulated Raman scattering by two simultaneously pulsed and spatially overlapped laser beams whose optical frequencies are separated by the vibrational frequency of the molecules to be tagged. The tagged molecules then move with the flow and, at a later time, are interrogated such that they emit or scatter light which is recorded by a camera system. Due to the long vibrational lifetime of diatomic molecules, significant displacement can occur between tagging and interrogation. The velocity of the flow can then be determined by dividing that displacement by the time interval between tagging and interrogation.

Due to the fact that two laser beams are required to vibrationally excite the diatomic molecules, many different patterns may be written into the flow field depending upon the measurement requirements. For example, by making the two lasers collinear, lines may be written across the flow field. The displacement of these lines gives a measure of the flow field velocity profile. Since very little energy is removed from the laser beams, the laser beams may be reflected back and forth through the flow field many times to write numerous lines, crosses, or grid patterns. Alternatively, one may cross the two lasers to write points in the flow field and record the motion of those points stereoscopically to generate three-dimensional velocity vectors. By crossing the laser beams multiple times, arrays of points may be written to give volumetric measurements of threedimensional velocity vectors. If the tagging lasers are crossed at an angle other than 90°, then a small shaped element can be written into the flow field due to the fact that the laser beams have finite diameters. The rotation of this volume element can be tracked to measure point vorticity. More sophisticated optics may be used to write more complex patterns into the flow field, so that such parameters as three-dimensional vorticity, helicity, and dilatation can be measured. In order to generate time-evolving measurements, multiple pulsed lasers can be used to write sequential lines and multiple interrogations may be used to generate multiple time images of a single line. This flow marking capability has been given the acronym RELIEF (Raman Excitation plus Laser-Induced Electronic Fluorescence) (R. Miles et al., Optics Lett., Vol. 12, #11, p. 861, 1987) and has been applied to a variety of air flows using oxygen as a tag.

The RELIEF technique is particularly attractive when compared to other velocity measurement techniques, since it does not require that any foreign material be seeded into most flow gases. The vibrational excitation step leaves the diatomic molecule in the same rotational state from which it started, and, as a consequence, causes very little temperature change. Thus, the tagging process is very nearly totally nonintrusive.

The tagging apparatus must generate two laser beams whose frequencies differ by the vibrational frequency of the diatomic molecule to be tagged. Beginning with a high-power pump laser beam, the second laser beam is created by passing the pump laser beam through a high-pressure cell filled with the molecular species to be tagged or a gas mixture containing the molecular species to be tagged. If the pump laser has high enough intensity and the focusing, gas pressure, and gas mixture are correct, the second laser beam will be generated by stimulated Raman scattering. The frequency of the second laser beam will then automatically be shifted from the pump frequency by the vibrational frequency of the molecule to be tagged. For example, if oxygen is to be tagged, this is accomplished by passing a high power pump laser pulse through a cell filled with oxygen gas or a mixture of oxygen and helium in order to generate a second beam of coherent light which is shifted in frequency by the vibrational frequency of oxygen through stimulated Raman scattering.

Stimulated Raman scattering is a well developed technique for generating frequency shifted coherent light. It is normally done with hydrogen which has a frequency shift of $1.246 \times 10^{14}$ Hz (see, for example, T.R. Loree et al., IEEE J. Quant. Elect. $OE$-15, #5, p. 337, May 1979). The frequency shift in oxygen is $4.662 \times 10^{-}$Hz and nitrogen is $6.988 \times 10^{13}$ Hz. Stimulated Raman scattering in oxygen is significantly more difficult than in hydrogen due to lower gain and greater competition with other processes (W. Lempert et al., JOSA B 7, #5, p. 717, May 1990). The coherence length of the pump laser and the pump laser focusing optics are chosen to give high conversion efficiency in the stimulated Raman cell while simultaneously minimizing competing processes including stimulated Brillouin (acoustic) backscattering and optical breakdown. The cell pressure and gas mixture are chosen to produce the proper frequency shift and to collisionally cool the molecules in the beam path so the cell may be run at a reasonable ($-10$ Hz) repetition rate.

Various embodiments of the tagging apparatus are taught herein, each of which accomplishes these optimizations in a somewhat different fashion. For oxygen, the simplest embodiment is a pump laser focused into a long cell, typically two meters long, filled with approximately one-thousand pounds per square inch of a 1:1 oxygen-to-helium mixture. The pump laser may be focused either for a single pass or refocused for multiple passes through this cell. The multiple pass configuration gives higher gain and, thus, higher conversion efficiency. Ideally, 50% conversion is desired since the tagging process is proportional to the product of the intensities of the two beams. In order to suppress Brillouin backscatter, the pump laser is operated with a relatively broad bandwidth to generate a short (on the order of centimeters) coherence length. Flow tagging is accomplished by refocusing the remaining pump laser beam and the simulated Raman beam into the test chamber.

Other embodiments of the invention include a cylindrically focussed multipass cell in order to shorten the cell length while still avoiding optical breakdown, and a picosecond pulse length pump laser to minimize the pump laser pulse energy while still maintaining the high power required for the high conversion efficiency in the stimulated Raman cell and high tagging efficiency in the sample volume. Similar considerations must be made for tagging nitrogen molecules. Hydrogen tagging is somewhat easier since the optical breakdown threshold for hydrogen is high, the stimulated Raman gain is high, and the thermal conductivity is high, so the addition of helium is not necessary.

BRIEF DESCRIPTION OF THE DRAWINGS

Various embodiments of the present invention are described below with reference to the drawings, in which like items are identified by the same reference designation, and in which.

DETAILED DESCRIPTION OF THE INVENTION

Figure 1:
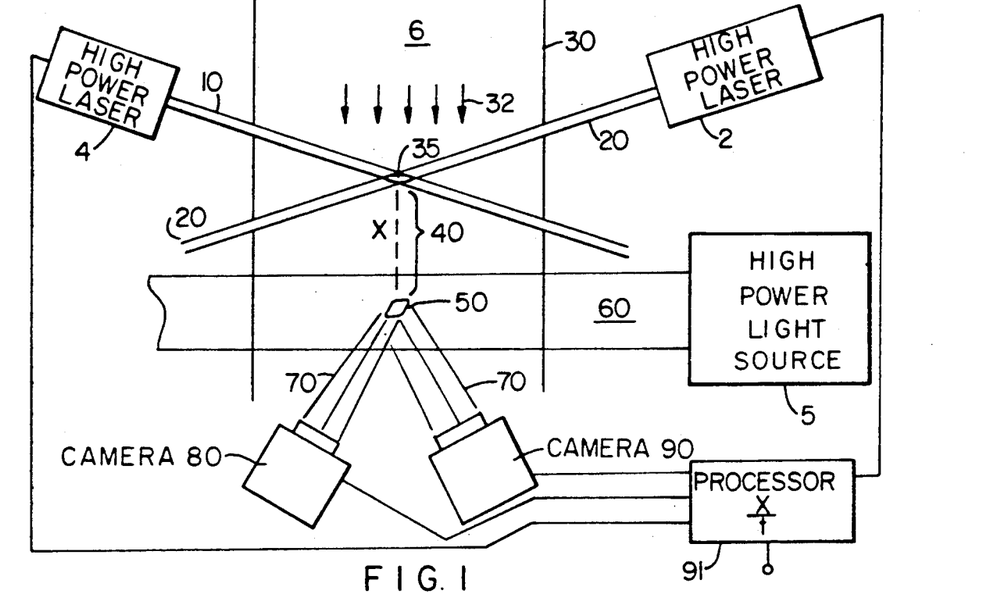
FIGS. 1 and 2 are simplified block-schematic drawings showing two embodiments, respectively, of the invention.

In order to achieve flow tagging, two high-powered laser beams must intersect each other in the sample volume 30, containing diatomic molecules such as hydrogen, nitrogen, or oxygen molecules in air, for example. An example is shown in FIG. 1. Two high powered lasers or light sources 2 and 4, typically pulsed frequency Nd:YAG laser 2 and a pulsed frequency tuneable dye laser 4, typically having five megawatts or greater power, are arranged for their laser beams 10 and 20, respectively, to intersect each other in the sample volume 30. The arrows 32 show the direction of motion of the flow field 6. If these two lasers 2 and 4 are separated in frequency by the vibrational frequency of the diatomic molecules to be tagged, then they drive some of these molecules into their vibrationally excited states in the overlap volume 35 through the mechanism of stimulated Raman scattering. These molecules then define a tagged region with the flow. The lifetime of these molecules in the vibrationally excited state is largely determined by collisional processes, particularly by collisions with water vapor molecules. For example, in dry air, oxygen molecules will stay in their excited state for hundreds of microseconds. During this period of time, the motion of the flow displaces the tagged region by some displacement distance 40. The displaced tagged region 50 may be rotated and changed in shape due to flow motion and somewhat larger in size than the original tagged region 35 due to diffusion. At some well defined time after the flow is tagged, the vibrationally excited molecules are interrogated by an interrogation beam 60 which causes them to emit or scatter light 70. This light 70 is detected by a camera 80 so that the displacement 40 of the sample volume can be measured. The direction of the displacement gives the velocity vector, and the ratio of the displacement x to the time interval t between tagging and interrogation gives the magnitude of the velocity. Note in FIG. 1 that processor 91 provides the computation x/t in a known manner. For example, processor 91 detects the time the overlap volume 35 is produced by lasers 2 and 4, and the later time of detection of tag region 50 by cameras 80 and 90, where "t" is the difference between these times. The distance "x" is known. Processor 91 then computes x/t. ratio of the displacement x to the time interval t between tagging and interrogation gives the magnitude of the velocity. The degree of rotation of the tagged region can be used to measure vorticity. For three-dimensional measurements of velocity, a second camera 90 can be included to yield stereoscopic images. Cameras 80 and 90 can be provided by vidicon systems, photomultipliers, or other conventional light detectors, for example.

Numerous ways of interrogation may be employed. For oxygen, an ultraviolet laser beam 60 further excites the tagged molecules to one or more upper electronic states from which they emit ultraviolet fluorescence 70. Typically, a pulsed ultraviolet argon fluoride excimer laser 5 with an energy of several millijoules or greater can be used for obtaining a laser beam 60. Alternatively, a UV flashlamp 5 may be used to generate a light beam 60 to interrogate oxygen by exciting the vibrationally tagged oxygen molecules to one or more upper electronic states from which they emit fluorescence 70, as was the case with the UV laser.

A high-intensity laser 5 may also be used to produce a high intensity laser beam 60 leading to two-photon absorption to an upper electronic state which emits fluorescence 70. This two-photon process is ideally suited for interrogation of vibrationally tagged hydrogen or nitrogen molecules which cannot easily be interrogated by single photon absorption, since their transitions lie in the vacuum ultraviolet. A high-intensity, narrow linewidth source beam 60 may be used for interrogation by spontaneous Raman scattering 70, and is appropriate for nitrogen which is the major constituent of air.

Figure 2:
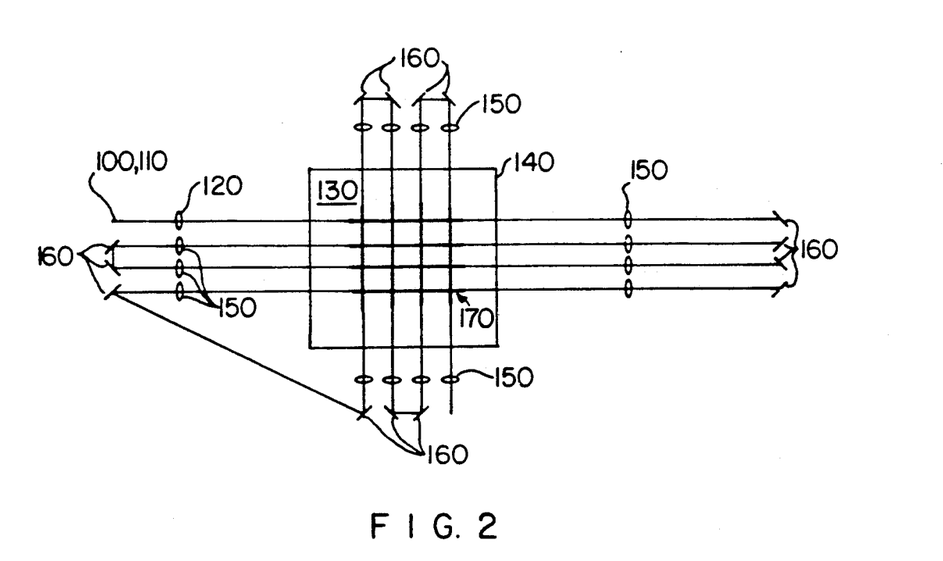

By changing the focusing, various patterns can be tagged. If the two laser beams 10 and 20 are made collinear, then the marked volume element becomes a line, so velocity profiles and turbulent structures can be observed. A pair of such lines may be used to write a cross. By using many such laser beams, or by reflecting the laser beams back and forth, many lines or a grid structure 170 can be tagged as shown in FIG. 2 to give volumetric velocity field measurements. A pair of collinear laser beams, 100 and 110, is focused by a lens 120 to write a line through the sample volume 140. The emerging beams are refocused and reflected by lenses 150 and mirrors 160 back and forth through the sample volume 140 to write a grid 170 in the flow field 130 therein. The refocusing could, alternatively, be done with curved mirrors. If the two laser beams enter the flow field separately, they can be reflected back and forth so they cross at multiple points, tagging an array of small shaped volume elements.

Figure 3:
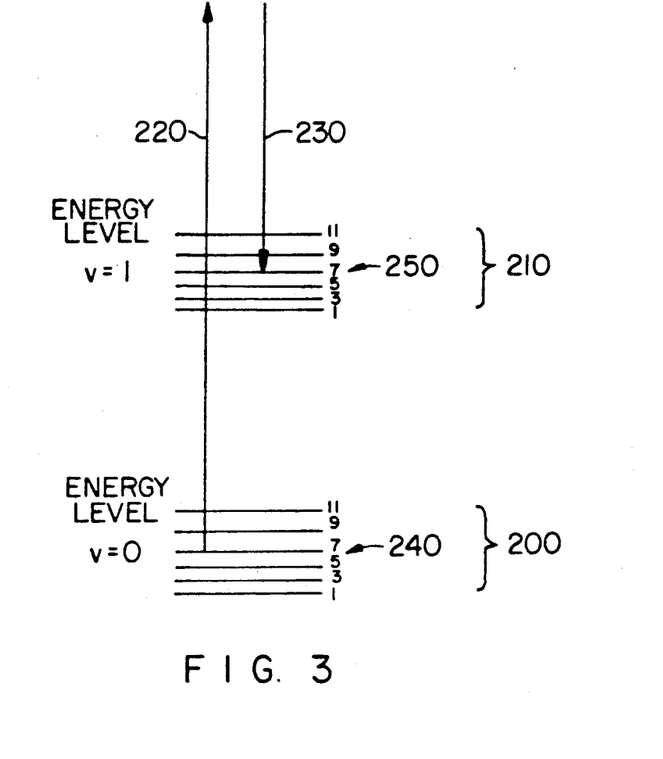
FIG. 3 is a simplified block-schematic drawing showing energy levels of oxygen relevant to various embodiments of the present invention.
Figure 4:
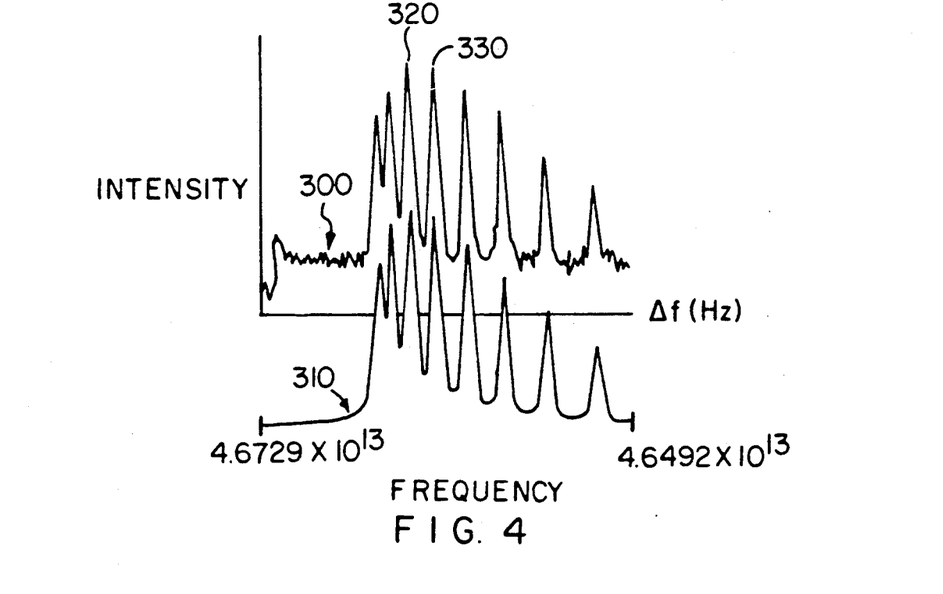
FIG. 4 shows curves for a Q-branch stimulated Raman spectrum for oxygen as measured, and as computed, respectively.

For a detailed analysis, oxygen is chosen as an example. The relevant energy levels of oxygen are shown in FIG. 3. Due to symmetry and nuclear spin, only the odd rotational states are present. The normal transitions which are driven by the stimulated Raman process are those of the Q-branch, i.e., those corresponding to transitions from the ground vibrational state 200 to the first excited vibrational state 210 which involve no change in rotational state. An example of the Q(7) transition is shown in FIG. 3. The "up" arrow 220 represents the energy of the higher frequency laser. The "down" arrow 230 represents the energy of the lower frequency laser. The separation in energy corresponds to the transition from the $v=0$, $J=7$ state 240 to the $v=1$, $J=7$ state 250. Similar transitions exist for each of the rotational states. If one laser beam, for example 220, is held constant in frequency, and the other 230 is tuned, then sequential Q-branch transitions are excited. An example of the Q-branch stimulated Raman spectrum taken in this manner is shown in FIG. 4. The upper curve 300 is measured, the lower curve 31 is computed. The separate peaks correspond to transitions from the separate rotational states. The amplitude distribution is representative of the temperature and, at room temperature, the peak amplitude occurs in the region of Q(7) 320, and Q(9) 330.

Figure 5:
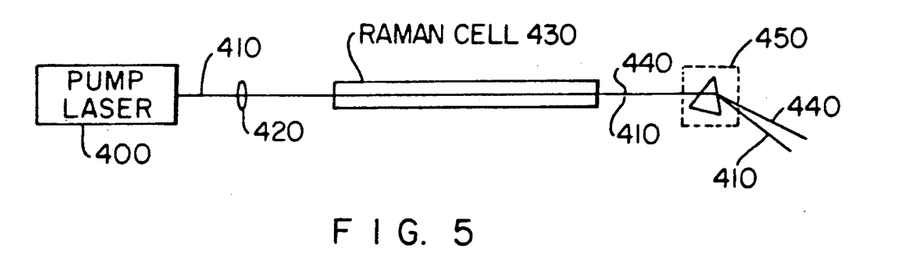
FIG. 5 is a simplified block-schematic drawing showing another embodiment of the invention.

In order to efficiently excite oxygen into the vibrational state, two high-powered laser beams must be used. A schematic diagram of the device to produce these two beams is shown in FIG. 5. The pump laser 400 generates a high-energy, pulsed laser beam 410 which is the focused by a lens 420 into a stimulated Raman cell 430 filled with a high-pressure gas mixture containing the diatomic molecular gas to be tagged. For example, if oxygen is to be tagged, the stimulated Raman cell 430 contains high pressure oxygen. If hydrogen is to be tagged, the cell 430 contains high pressure hydrogen, and if nitrogen is to be tagged, the cell 430 contains high pressure nitrogen. In the case of oxygen and nitrogen, helium gas may be added in order to increase the thermal diffusion rate within the cell 430 to minimize local heating. By self-generated stimulated Raman scattering, a frequency shifted laser beam 440 is generated collinear with the input laser beam 410. Also exiting the cell 430 is the remaining, unconverted pump laser beam 410. These two beams may either be left together or separated by a prism 450 or a dichroic mirror in place of prism 450.

An added feature of the Raman cell 430 is that the absolute frequency of the original pump laser beam 410 is not critical. Since the frequency shift is determined by the stimulated Raman cell 430, the frequency difference between the original laser beam 410 and the shifted laser beam 440 is independent of the absolute frequencies. This means that such a laser system can operate in a noisy environment where a separately controlled pair of lasers would be difficult to stabilize. Those knowledgeable in the field also understand that the high-pressure stimulated Raman cell 430 could be included within the pump laser cavity to generate the second frequency shifted beam.

Figure 6:
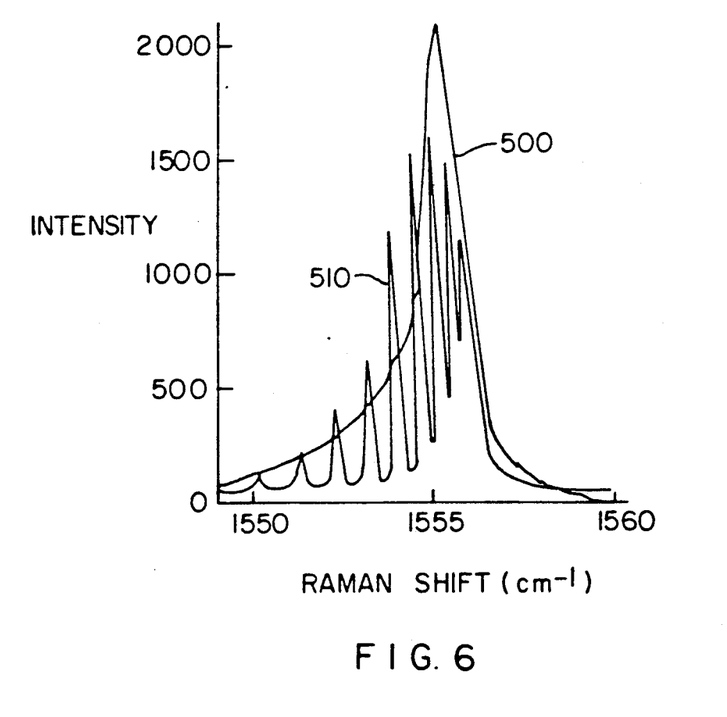
FIG. 6 shows curves for a pressure-shifted Raman spectrum relative to the spectrum for atmospheric pressure for oxygen.

High-pressure gas mixtures undergo significant rotational narrowing and pressure shifting of the Raman spectrum. For example, a rotationally narrowed and pressure-shifted Raman spectrum 500 of the Q-branch of oxygen is shown in FIG. 6 for a pressure of 45 atm and a helium/oxygen ratio of 2:1. This can be compared with the spectrum for atmospheric pressure oxygen 510 to generate an understanding of the difference. As a consequence, the pressure and the mixture ratio in the high-pressure cell must be properly chosen to insure the self-generated stimulated Raman scattered light 440 differs in frequency from the laser beam 410 by the amount required to excite vibrationally the molecules to be tagged in the sample volume. This is done by choosing the stimulated Raman cell pressure and gas mixture such that the peak of the rotationally narrowed and pressure shifted Raman spectrum 500 overlaps the strong lines in the atmospheric pressure spectrum 510.

Those knowledgeable in the field will understand that the stimulated Raman scattering process and, thus, the flow tagging efficiency in the collision-dominated, unsaturated limit is proportional to the product of the pump laser beam 410 intensity and the shifted beam 440 intensity, for example. Consequently, it is important to achieve high conversion efficiencies in the tagging apparatus. Referring back to FIG. 5, a broad bandwidth pump laser beam 410 is important in order to eliminate stimulated Brillouin and backward Raman scattering in the high pressure stimulated Raman cell 430, both of which occur in the backward direction. If present, these competing processes significantly decrease both the total throughput and the conversion efficiency of the stimulated Raman cell 430. A broad bandwidth pump laser beam 410 is also desirable in order to pump a larger percentage of the molecules into the excited state.

Figure 7:
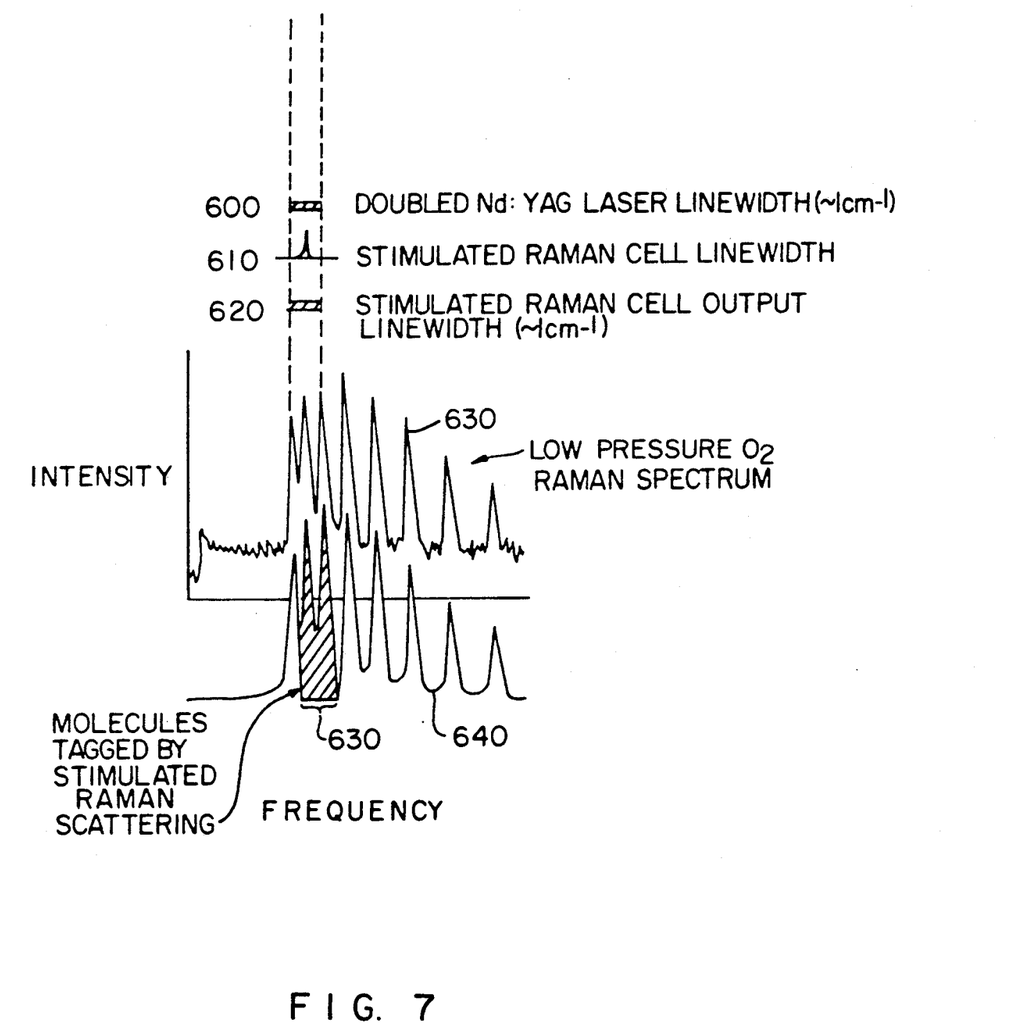
FIG. 7 shows a curve for oxygen for the spectrum for a broad bandwidth pump laser relative to the curve for the gain narrowed Raman shift of the pump laser beam.

A broad bandwidth pump laser [frequency doubled Nd:YAG laser with a linewidth $\approx 1.0$ cm$^{-1}$, for example], such as laser beam 410 in FIG. 5, is converted by the gain narrowed Raman shift in the stimulated Raman cell 430 to a broad bandwidth stimulated Raman laser beam 440, in this example, which is shifted in frequency by the vibrational frequency of the molecules in the stimulated Raman cell. In FIG. 7, the measured atmospheric oxygen Raman spectrum is shown as curve 630, and the calculated atmospheric pressure oxygen Raman spectrum is shown as curve 640. The two pump laser beams 410 and 440 have laser beam spectrums 600 and 620, respectively. The narrow linewidth of the high pressure Raman cell is indicated by 610. The broad bandwidth of both beams 600 and 620 allows them to overlap several rotational transitions 630 of the molecular species to be tagged, in this example, oxygen, thus having the potential to tag a larger percentage of the molecules than is possible with two narrow linewidth laser beams.

An optimum situation occurs with a picosecond timescale pump laser 400 where the bandwidth of the beam 410 is broad and the intensity is high, but the total energy of the pulse is low. In this case, the conversion in the stimulated Raman cell 430 can be very high with little competition from stimulated Brillouin backscattering and optical breakdown. The output of the stimulated Raman cell 440 will also have a picosecond timescale. The tagging efficiency can be made very high since the stimulated Raman tagging process is now in the collisionless regime, permitting the population to be coherently driven with the possibility of achieving 100% of the molecular population in the vibrationally excited state. Picosecond laser beams 410 and 440 are also desirable since the total energy is low, so the probability of optical damage to windows and optics is minimized.

Figure 8:
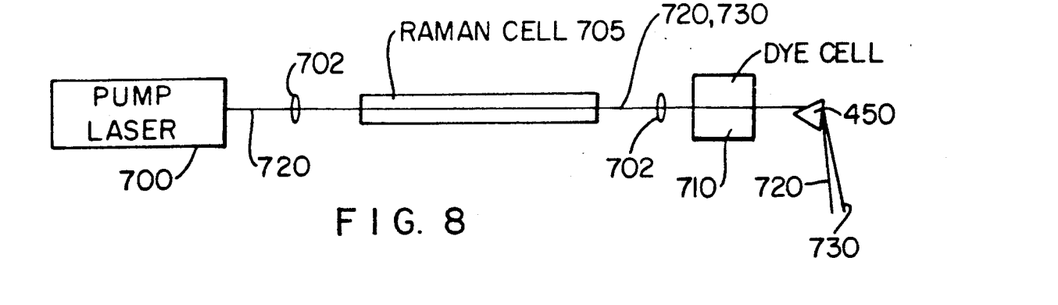
FIGS. 8 through 10 show simplified block-schematic diagrams for other embodiments, respectively, of the present invention.

To further enhance the conversion efficiency to yield optimal flow tagging, several other preferred embodiments of the present invention will now be described. A second embodiment, as shown in FIG. 8, includes a pump laser 700 driving a high-pressure stimulated Raman cell 705 which is followed by a dye cell amplifier 710. Beam focusing lenses 702 are generally shown. It is well known that higher frequency laser beams may be used with dyes to amplify lower frequency laser beams. In this case, the residual unconverted energy from the original pump laser beam 720 passes into the dye cell 710, generating gain and therefore further amplifying the frequency-shifted laser beam 730. Since the beams 720 and 730 overlap, both spatially and in time, this becomes an efficient method to amplify the frequency shifted beam 730 and therefore increases the product of the two beam energies. The dye solution is made dilute enough so that the residual light in the pump beam 720 can be used together with the now amplified shifted light 730 to accomplish flow tagging.

Figure 9:
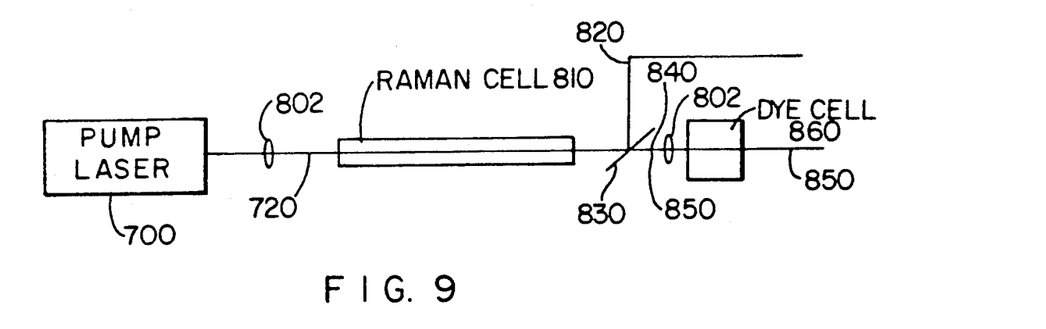

A third embodiment of the invention is shown in FIG. 9. The pump laser 800 generates a beam 805 which is focused via a lens 802 into the stimulated Raman cell 810. A portion 820 of the pump laser beam 805 is removed after the stimulated Raman cell 810 by a dichroic mirror 830. The remainder of that beam 840, together with the frequency shifted beam 850 from the stimulated Raman cell 810, passes into the dye cell 860. In this case, the dye is made more absorbing by increasing its concentration, and the shifted laser beam 850 is amplified as much as possible. The split-off beam 820 and the amplified, shifted beam 850 are then combined for tagging.

Figure 10:
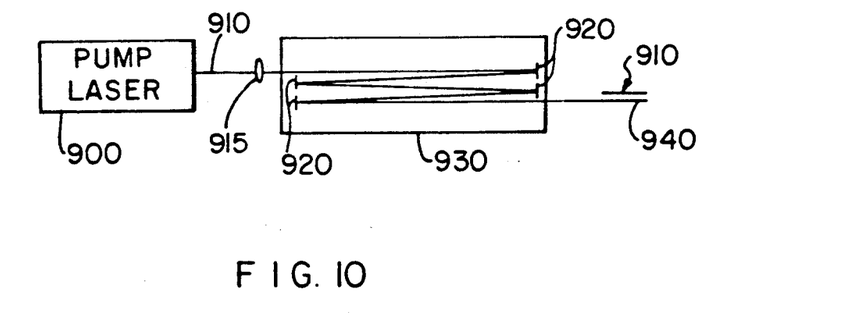

A fourth embodiment of the invention is shown in FIG. 10 in which a multiple pass cell 930 is used in order to increase the conversion efficiency. In this case, the pump laser 900 generates a beam 910 which is focused via lens 915 into the stimulated Raman cell 930, and is reflected by mirrors 920 so that it is passed two or more times through the stimulated Raman cell 930 to further enhance the energy conversion from the pump laser beam to the frequency shifted laser beam 940. The cell may be operated with cylindrical focusing mirrors 920 and a cylindrical focusing lens 915 to reduce the peak intensity of the pump laser beam 910 inside the cell. This minimizes such competing effects as optical breakdown, stimulated Brillouin scattering, and thermal heating. The output of the flow tagging device is a pair of beams 910, 940, whose frequencies are separated by the vibrational frequency of the molecular species to be tagged.

Figure 11:
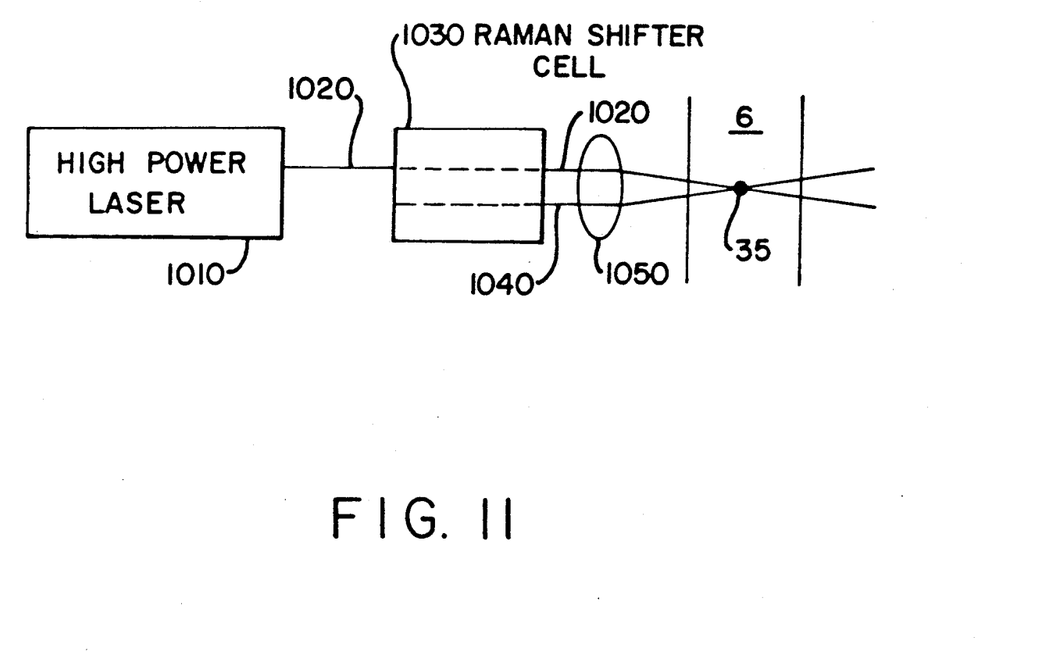
FIG. 11 shows a simplified block schematic diagram constructed from features of embodiments of the invention shown in FIGS. 1, 5, 8, 9, and 10.

A molecular tagging system of one embodiment of the invention is shown in FIG. 11. It consists of high power laser 1010, which emits a pump bean 1020 that is focussed into a Raman shifter cell 1030. Similar Raman cells 430, 705, and 810 may be constructed in any of the embodiments described in FIGS. 5, 8, 9, and 10, respectively. As it passes through the cell, the high power laser beam 1020 generates a second high power laser beam 1040 whose frequency is shifted by the vibrational frequency of the molecule to be tagged. A portion of the pump beam 1020 and the newly generated stimulated Raman beam 1040 exit the cell 1030 and are focussed by lens 1050 into the flow region 6 to tag the molecules of interest in the overlap volume 35. Typically, beams 1020 and 1040 would be on top of, or coincident with, one another as they are emitted from the Raman cell 1030. In FIG. 11, the beams are shown to be displaced from one another as emitted, and focused as described. These two beams, 1020 and 1040, serve as the two high power laser beams 10 and 20 shown in FIG. 1.

Referring back to FIG. 1, the interrogation portion of the apparatus consists of a high power light source 5 with an output beam 60 which illuminates the flow field in the vicinity of the displaced tagged flow region 50. There are several approaches to the interrogation step since any optical mechanisms which permits the displaced flow element to be observed will serve.

Although various embodiments of the invention are described herein for purposes of illustration, they are not meant to be limiting. Those of skill in the art may recognize modifications that can be made in the illustrated embodiments. Such modifications are meant to be covered by the spirit and scope of the appended claims.

What is claimed is:

1. A molecular tagging system comprising:
   a first pump laser for producing a first laser beam;
   a stimulated Raman cell positioned for receiving as an input said first laser beam, said stimulated Raman cell being pumped by a portion of said first laser beam for producing a second laser beam differing in frequency from said first laser beam by the vibrational frequency of a molecular species to be tagged, said stimulated Raman cell outputting said first and second laser beams; and
   first focusing means for focusing said first and second laser beams to form an overlapping region within a volume, whereby a fraction of the molecular species to be tagged are driven into their first vibrational state by stimulated Raman pumping, thereby tagging the molecules of a well defined region within the volume.

2. The molecular tagging system of claim 1, wherein said first laser beam consists of a relatively short duration pulse of about tens of picoseconds, for minimizing total energy requirements while providing the necessary high intensity required both for generation of said second laser beam, and for maintaining stimulated Raman pumping of said molecular species to be tagged.

3. The molecular tagging system of claim 1, wherein said first pump laser is operated for producing said first laser beam having a broad bandwidth, for generating a broad bandwidth in said second laser beam, the latter insuring that the stimulated Raman process accesses more than one rotational state of said molecular species to be tagged, for increasing the efficiency of tagging said molecules.

4. The molecular tagging system of claim 1, wherein said first pump laser is operated for said first laser beam having a short coherence length for minimizing the light lost to stimulated Brillouin scattering in said stimulated Raman cell.

5. The molecular tagging system of claim 1, wherein said molecular species to be tagged is oxygen.

6. The molecular tagging system of claim 1, wherein said molecular species to be tagged is nitrogen.

7. The molecular tagging system of claim 1, wherein said molecular species to be tagged is hydrogen.

8. The molecular tagging system of claim 1, further including:
   a second pump laser for producing an interrogation laser beam having a frequency overlapping one or more single photon transitions from a vibrationally excited state to an upper electronic state of the molecular species to be tagged, for causing laser-induced fluorescence in the latter, said interrogation laser beam being both passed through said volume, and delayed in time from said first and second laser beams such that the laser-induced fluorescence resulting from the upper electronic state is indicative of the displacement of the tagged molecules, over the time interval between the time of tagging these molecules and the time when said interrogation laser beam is passed through the sample volume, whereby the flow velocity of said tagged molecules is computed by dividing the displacement by the time interval.

9. The molecular tagging system of claim 1, further including:
- a pulsed flashlamp for producing a high intensity flashlamp beam having frequencies overlapping single photon transitions in the molecular species to be tagged, from the vibrationally excited state to an upper electronic state which fluoresces, said flashlamp being positioned for passing said flashlamp beam through said volume, said flashlamp beam being delayed in time from said first and second laser beams a sufficient amount for insuring that the fluorescence emanating from the upper electronic state of said molecules provides an indication of the displacement of the tagged molecules over the time interval between the time of tagging the molecules and the time said flashlamp beam passes through the sample volume, the displacement divided by the time interval being equal to the velocity of the tagged molecules.

10. The molecular tagging system of claim 1, further including:
- a second pump laser for producing a high-intensity laser beam tuned to a frequency corresponding to a two-photon transition in said molecular species to be tagged, originating from the vibrationally excited state and going to an upper electronic level in which said molecular species fluoresces, said high intensity laser beam both being passed through the sample volume, and being delayed in time from said first and second laser beams, such that the induced fluorescence from the tagged molecular species provides an indication of the displacement of the tagged molecular species over the time interval between the time at which it was tagged and the time at which the high-intensity laser beam passes through the volume, the displacement divided by the time interval being equal to the flow velocity of the tagged molecules.

11. The molecular tagging system of claim 1, further including:
- a high intensity light or laser source for producing a high-intensity narrow linewidth light beam, for passage through the sample volume, the latter beam being delayed in time from said first and second laser beams such that spontaneous Raman scattering it generates from said molecular species to be tagged permits observation of these molecules, thereby giving an indication of the location and displacement of the tagged molecular species over the time interval between the time at which it was tagged and the time at which said spontaneous Raman scattering is observed, said displacement divided by said time interval giving the flow velocity.

12. The molecular tagging system of claim 1, further including means for crossing said first and said second laser beams within said volume, for forming a small shaped volume element as said overlap region, whereby the motion thereof is indicative of the local velocity.

13. The molecular tagging system of claim 1, further including means for directing said first and second beams for causing said overlap region to be a line, the displacement of this line being indicative of the velocity profile of the moving fluid encompassing said molecules.

14. The molecular tagging system of claim 1, further including means for directing said first and second beams for causing said overlap region to consist of a pair of lines forming a cross, the motion of said cross providing an indication of the local velocity vector.

15. The molecular tagging system of claim 1, further including means for directing said first and second laser beams to cause said overlap region to consist of a grid of lines, the latter's motion and distortion giving a view of the velocity field.

16. The molecular tagging system of claim 5, wherein said stimulated Raman cell is filled with high-pressure oxygen gas.

17. The molecular tagging system of claim 5, wherein said stimulated Raman cell is filled with an oxygen/helium gas mixture, the helium serving to increase the rate at which the cell returns to thermal equilibrium, thereby increasing the repetition rate at which said stimulated Raman cell can be used.

18. The molecular tagging system of claim 6, wherein said stimulated Raman cell is filled with nitrogen.

19. The molecular tagging system of claim 6, wherein said stimulated Raman cell is filled with a nitrogen/helium mixture, the helium serving to increase the rate at which the cell returns to thermal equilibrium, thereby increasing the repetition rate at which said stimulated Raman cell can be used.

20. The molecular tagging system of claim 7, wherein said stimulated Raman cell is filled with hydrogen.

21. The molecular tagging system of claim 1, wherein said stimulated Raman cell includes means for passing said first laser beam through said cell multiple times, thereby producing greater gain and consequently greater conversion efficiently in forming said second laser beam.

22. The molecular tagging system of claim 1, wherein said stimulated Raman cell includes means for cylindrically focussing said first laser beam and passing the beam through said cell multiple times, for producing greater gain and, consequently, greater conversion efficiency in forming said second laser beam within said cell, while simultaneously reducing competing processes including optical breakdown and stimulated Brillouin scattering.

23. A molecular tagging system comprising:
- a first pump laser for producing a first laser beam;
- a second pump laser for producing a second laser beam differing in frequency from said first laser beam by the vibrational frequency of a molecular species to be tagged;
- said first and second laser beams forming an overlapping region within a volume, whereby a fraction of the molecular species to be tagged are driven into their first vibrational state by stimulated Raman pumping, thereby tagging the molecules of a well defined region within the volume; and
- a third pump laser for producing an interrogation laser beam having a frequency overlapping one or more single photon transitions from a vibrationally excited state to an upper electronic state of the molecular species to be tagged, for causing laser-induced fluorescence in the latter, said interrogation laser beam being both passed through said volume, and delayed in time from said first and second laser beams such that the laser-induced fluorescence resulting from the upper electronic state is indicative of the displacement of the tagged molecules, over the time interval between the time of tagging these molecules and the time when said interrogation laser beam is passed through the sample volume, whereby the flow velocity of said tagged molecules is computed by dividing the displacement by the time interval.

24. A molecular tagging system comprising:
a first pump laser for producing a first laser beam;
a second pump laser for producing a second laser beam differing in frequency from said first laser beam by the vibrational frequency of a molecular species to be tagged;
said first and second laser beams forming an overlapping region within a volume, whereby a fraction of the molecular species to be tagged are driven into their first vibrational state by stimulated Raman pumping, thereby tagging the molecules of a well defined region within the volume; and
a pulsed flashlamp for producing a high intensity flashlamp beam having frequencies overlapping single photon transitions in the molecular species to be tagged, from the vibrationally excited state to an upper electronic state which fluoresces, said flashlamp being positioned for passing said flashlamp beam through said volume, said flashlamp beam being delayed in time from said first and second laser beams a sufficient amount for insuring that the fluorescence emanating from the upper electronic state of said molecules provides an indication of the displacement of the tagged molecules over the time internal between the time of tagging the molecules and the time said flashlamp beam passes through the sample volume, the displacement divided by the time interval being equal to the velocity of the tagged molecules.

25. A molecular tagging system comprising:
a first pump laser for producing a first laser beam;
a second pump laser for producing a second laser beam differing in frequency from said first laser beam by the vibrational frequency of a molecular species to be tagged;
said first and second laser beams forming an overlapping region within a volume, whereby a fraction of the molecular species to be tagged are driven into their first vibrational state by stimulated Raman pumping, thereby tagging the molecules of a well defined region within the volume; and
a third pump laser for producing a high-intensity laser beam tuned to a frequency corresponding to a two-photon transition in said molecular species to be tagged, originating from the vibrationally excited state and going to an upper electronic level in which said molecular species fluoresces, said high intensity laser beam both being passed through the sample volume, and being delayed in time from said first and second laser beams, such that the induced fluorescence from the tagged molecular species provides an indication of the displacement of the tagged molecular species over the time interval between the time at which it was tagged and the time at which the high-intensity laser beam passes through the volume, the displacement divided by the time interval being equal to the flow velocity of the tagged molecules.

26. A molecular tagging system comprising:
a first pump laser for producing a first laser beam;
a second pump laser for producing a second laser beam differing in frequency from said first laser beam by the vibrational frequency of a molecular species to be tagged;
said first and second laser beams forming an overlapping region within a volume, whereby a fraction of the molecular species to be tagged are driven into their first vibrational state by stimulated Raman pumping, thereby tagging the molecules of a well defined region within the volume; and
a high intensity light or laser source for producing a high-intensity narrow line width light beam, for passage through the sample volume, the latter beam being delayed in time from said first and second laser beams such that spontaneous Raman scattering it generates from said molecular species to be tagged permits observation of these molecules, thereby giving an indication of the location and displacement of the tagged molecular species over the time interval between the time at which it was tagged and the time at which said spontaneous Raman scattering is observed, said displacement divided by said time interval giving the flow velocity.

* * * * *

UNITED STATES PATENT AND TRADEMARK OFFICE
CERTIFICATE OF CORRECTION

PATENT NO. : 5,110,204
DATED : May 5, 1992
INVENTOR(S) : Richard B. Miles and Walter R. Lempert It is certified that error appears in the above-identified patent and that said Letters Patent is hereby corrected as shown below:

Column 2, line 12, after "DT" delete "U.S.".

Column 3, line 1, change "Photomeohanics" to --Photomechanics--.

Column 4, line 30, change "OE-15" to --QE-15--;

line 32, change "10-Hz" to --$10^{13}$ Hz--; and         line 45, change "-10 Hz" to --$\sim$10 Hz--.

Signed and Sealed this

Seventeenth Day of August, 1993

*Attest:*

BRUCE LEHMAN

*Attesting Officer*     *Commissioner of Patents and Trademarks*